US012175949B2

(12) United States Patent
Wang et al.

(10) Patent No.: US 12,175,949 B2
(45) Date of Patent: Dec. 24, 2024

(54) COLOR COORDINATE CALIBRATION METHOD, SYSTEM, PROCESSING DEVICE AND COMPUTER STORAGE MEDIUM

(71) Applicants: Beijing BOE Display Technology Co., Ltd., Beijing (CN); BOE Technology Group Co., Ltd., Beijing (CN)

(72) Inventors: Jianting Wang, Beijing (CN); Xibin Shao, Beijing (CN); Changjia Fu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/913,430

(22) PCT Filed: Nov. 10, 2021

(86) PCT No.: PCT/CN2021/129773
§ 371 (c)(1),
(2) Date: Sep. 21, 2022

(87) PCT Pub. No.: WO2022/242062
PCT Pub. Date: Nov. 24, 2022

(65) Prior Publication Data

US 2024/0212647 A1 Jun. 27, 2024

(30) Foreign Application Priority Data

May 21, 2021 (CN) ........................ 202110560502.X

(51) Int. Cl.
*G09G 5/02* (2006.01)
*G09G 3/00* (2006.01)

(52) U.S. Cl.
CPC ............... *G09G 5/02* (2013.01); *G09G 3/006* (2013.01); *G09G 2320/0626* (2013.01); *G09G 2320/0666* (2013.01); *G09G 2320/0693* (2013.01)

(58) Field of Classification Search
CPC ........... G09G 2320/0693; G09G 3/006; G09G 2330/12; G09G 3/2003; G09G 2320/0666
See application file for complete search history.

(56) References Cited

U.S. PATENT DOCUMENTS

| | | | |
|---|---|---|---|
| 6,388,648 | B1 | 5/2002 | Clifton et al. |
| 2005/0270383 | A1 | 12/2005 | Hung |

(Continued)

FOREIGN PATENT DOCUMENTS

| | | | |
|---|---|---|---|
| CN | 1748241 | A | 3/2006 |
| CN | 101644875 | A | 2/2010 |

(Continued)

OTHER PUBLICATIONS

International Search Report for PCT/CN2021/129773 Mailed Feb. 22, 2022.

(Continued)

*Primary Examiner* — Sanjiv D. Patel
(74) *Attorney, Agent, or Firm* — Ling Wu; Stephen Yang; Ling and Yang Intellectual Property

(57) ABSTRACT

A color coordinate calibration method, system, a processing device and a computer storage medium are provided. The method includes: displaying a test image on a display screen, testing the chromaticity of the display screen, and obtaining test color coordinates of a plurality of primary color lights; Detecting whether the test color coordinates of the plurality of primary color lights are within the standard color coordinate ranges of the plurality of primary color lights; when the test color coordinates of one or more primary color lights (Continued)

are not within the standard color coordinate ranges of the corresponding primary color lights, determining target color coordinates and target white balance color temperatures of a plurality of primary color lights, and adjusting the test color coordinates of one or more primary color lights to be within standard color coordinate ranges of the corresponding primary color lights.

10 Claims, 7 Drawing Sheets

(56) References Cited

U.S. PATENT DOCUMENTS

| | | | | |
|---|---|---|---|---|
| 2006/0139368 | A1 | 6/2006 | Kinoshita et al. | |
| 2009/0290068 | A1 | 11/2009 | Abe et al. | |
| 2010/0045211 | A1* | 2/2010 | Kitamura | G09G 3/3611 315/309 |
| 2015/0222866 | A1 | 8/2015 | Lin | |
| 2016/0284284 | A1* | 9/2016 | Liu | G09G 3/2003 |
| 2017/0330498 | A1 | 11/2017 | Orio et al. | |
| 2018/0308452 | A1 | 10/2018 | Zhang | |
| 2019/0387132 | A1 | 12/2019 | Rao | |

FOREIGN PATENT DOCUMENTS

| | | | |
|---|---|---|---|
| CN | 102419947 | A | 4/2012 |
| CN | 103414905 | A | 11/2013 |
| CN | 104766574 | A | 7/2015 |
| CN | 105405413 | A | 3/2016 |
| CN | 106652886 | A | 5/2017 |
| CN | 107068114 | A | 8/2017 |
| CN | 107369408 | A | 11/2017 |
| CN | 107682682 | A | 2/2018 |
| CN | 107888893 | A | 4/2018 |
| CN | 108257572 | A | 7/2018 |
| CN | 110299102 | A | 10/2019 |
| CN | 110675797 | A | 1/2020 |
| CN | 111341283 | A | 6/2020 |
| CN | 112261397 | A | 1/2021 |
| CN | 112289250 | A | 1/2021 |
| CN | 113270063 | A | 8/2021 |
| WO | 2005076252 | A1 | 8/2005 |

OTHER PUBLICATIONS

Ziquan Zhao et al., Color Gamut Correction of LED Displays, Chinese Journal of Liquid Crystals and Displays, vol. 28, No. 1, Feb. 2013, pp. 92-98.

Office Action dated Jul. 1, 2022 for Chinese Patent Application No. 202110560502.X and English Translation.

* cited by examiner

COLOR COORDINATE CALIBRATION METHOD, SYSTEM, PROCESSING DEVICE AND COMPUTER STORAGE MEDIUM

CROSS-REFERENCE TO RELATED APPLICATIONS

The present application is a U.S. National Phase Entry of International Application No. PCT/CN2021/129773 having an international filing date of Nov. 10, 2021, which claims the priority of the Chinese patent application filed to the CNIPA on May 21, 2021 with the application number 202110560502.X and the title "Color Coordinate Calibration Method, System, Processing Device and Computer Storage Medium". The above-identified applications are hereby incorporated by reference.

TECHNICAL FIELD

The present disclosure relates to, but is not limited to, the technical field of display, in particular to a color coordinate calibration method, a color coordinate calibration system, a processing device and a computer storage medium.

BACKGROUND

Color gamut refers to the range of the quantity of colors that can be expressed by a display device. The colors of visible spectrum in nature form the largest color gamut space, which contains all the colors that can be seen by human eyes. Display technology is a medium for displaying information, and displaying the original color of objects to the greatest extent is the goal pursued by high-quality display devices, which requires further improvement of the color gamut of display products.

At present, when some display screens are debugged from the factory, it is needed to test whether the display parameters such as color gamut and color temperature meet the requirements of the test standard. If they do not meet the requirements of the test standard, it is needed to manually modify the display parameters repeatedly and debug them until the display parameters meet the requirements of the test standard. The process is very cumbersome.

SUMMARY

The following is a summary of subject matters described herein in detail. The summary is not intended to limit the protection scope of claims.

An embodiment of the present disclosure provides a color coordinate calibration method, which comprises the following steps:

- allowing a display screen to display a test image, testing a chromaticity of the display screen, and obtaining test color coordinates of a plurality of primary color lights;
- detecting whether the test color coordinates of the plurality of primary color lights are within standard color coordinate ranges of the plurality of primary color lights; and
- determining target color coordinates and target white balance color temperatures of the plurality of primary color lights when the test color coordinates of one or more of the primary color lights are not within the standard color coordinate ranges of the corresponding primary color lights, and adjusting the test color coordinates of the one or more of primary color lights to be within the standard color coordinate ranges of the corresponding primary color lights according to the test color coordinates, the target color coordinates and the target white balance color temperatures.

In an exemplary embodiment, the primary color lights include a first primary color light, a second primary color light, and a third primary color light, and the standard color coordinate ranges include primary color wavelength requirement ranges for broadcast-grade professional monitors under the BT2020 color gamut.

In an exemplary embodiment, determining the target color coordinates of the primary color lights of the display screen includes:

- acquiring a color coordinate boundary value corresponding to the primary color light; and
- determining the color coordinate boundary value which is closest to the test color coordinates corresponding to the primary color light as the target color coordinates of the primary color light.

In an exemplary embodiment, adjusting the test color coordinates of one or more of the primary color lights to be within the standard color coordinate ranges of the corresponding primary color lights according to the test color coordinates, the target color coordinates and the target white balance color temperatures includes:

- calculating coordinates of an intersection of a first connecting line and a second connecting line in a color gamut space, and using the intersection coordinates of the first connecting line and the second connecting line as calibrated color coordinates of the second primary color light, wherein the first connecting line is connected to the test color coordinates of the first primary color light and the test color coordinates of the second primary color light or to the test color coordinates of the first primary color light and the test color coordinates of the third primary color light, and the second connecting line is connected to the target color coordinates and the target white balance color temperatures of the second primary color light; and
- acquiring eye tristimulus values corresponding to the test color coordinates of the plurality of primary color lights, and calculating adjustment coefficients of three primary colors corresponding to the second primary color light according to the eye tristimulus values corresponding to the test color coordinates of the plurality of primary color lights and the calibrated color coordinates of the second primary color light.

In an exemplary embodiment, the test color coordinates of the first primary color light are (x10, y10), the test color coordinates of the second primary color light are (x20, y20), the target color coordinates of the second primary color light are (x21, y21), the target white balance color temperatures are (xw1, yw1), and the calibrated color coordinates of the second primary color light are calculated as (x2t, y2t) according to the following formula:

$$(x2t-x10)/(x20-x10)=(y2t-y10)/(y20-y10)$$

$$(x2t-xw1)/(x21-xw1)=(y2t-yw1)/(y21-yw1);$$

eye tristimulus values corresponding to the test color coordinates of the first primary color light are (X10, Y10, Z10), eye tristimulus values corresponding to the test color coordinates of the second primary color light are (X20, Y20, Z20), eye tristimulus values corresponding to the test color coordinates of the third primary color light are (X30, Y30, Z30), and the calibrated color coordinates of the second primary color light are (x2t, y2t, z2t), and adjustment coefficients (S21, S22, S23) of three primary colors corresponding to the second primary color light are calculated according to the following formula:

$$x2t=(S21*X10+S22*X20+S23*X30)/S;$$

$$y2t=(S21*Y10+S22*Y20+S23*Y30)/S;$$

$$z2t=(S21*Z10+S22*Z20+S23*Z30)/S;$$

wherein S is a constant.

In an exemplary embodiment, adjusting the test color coordinates of one or more of the primary color lights to be within the standard color coordinate ranges of the corresponding primary color lights according to the test color coordinates, the target color coordinates and the target white balance color temperatures includes:

calculating coordinates of an intersection of a third connecting line and a fourth connecting line in a color gamut space, and using the intersection coordinates of the third connecting line and the fourth connecting line as calibrated color coordinates of the third primary color light, wherein the third connecting line is connected to the test color coordinates of the first primary color light and the test color coordinates of the third primary color light or to the test color coordinates of the second primary color light and the test color coordinates of the third primary color light, and the fourth connecting line is connected to the target color coordinates and the target white balance color temperatures of the third primary color light; and acquiring eye tristimulus values corresponding to the test color coordinates of the plurality of primary color lights, and calculating adjustment coefficients of three primary colors corresponding to the third primary color light according to the eye tristimulus values corresponding to the test color coordinates of the plurality of primary color lights and the calibrated color coordinates of the third primary color light.

In an exemplary embodiment, the test color coordinates of the first primary color light are (x10, y10), the test color coordinates of the third primary color light are (x30, y30), the target color coordinates of the third primary color light are (x31, y31), the target white balance color temperatures are (xw1, yw1), and the calibrated color coordinates of the third primary color light are calculated as (x3t, y3t) according to the following formula:

$$(x3t-x10)/(x30-x10)=(y3t-y10)/(y30-y10)$$

$$(x3t-x31)/(xw1-x31)-(y3t-y31)/(yw1-y31);$$

Eye tristimulus values corresponding to the test color coordinates of the first primary color light are (X10, Y10, Z10), eye tristimulus values corresponding to the test color coordinates of the second primary color light are (X20, Y20, Z20), eye tristimulus values corresponding to the test color coordinates of the third primary color light are (X30, Y30, Z30), the calibrated color coordinates of the third primary color light are (x3t, y3t, z3t), and adjustment coefficients (S31, S32, S33) of three primary colors corresponding to the third primary color light are calculated according to the following formula:

$$x3t=(S31*X10+S32*X20+S33*X30)/S;$$

$$y3t=(S31*Y10+S32*Y20+S33*Y30)/S;$$

$$z3t=(S31*Z10+S32*Z20+S33*Z30)/S;$$

wherein S is a constant.

In an exemplary embodiment, adjusting the test color coordinates of the one or more of the primary color lights to be within the standard color coordinate ranges of the corresponding primary color lights according to the test color coordinates, the target color coordinates and the target white balance color temperatures includes:

calculating coordinates of an intersection of a fifth connecting line and a sixth connecting line in a color gamut space, and using the intersection coordinates of the fifth connecting line and the sixth connecting line as calibrated color coordinates of the first primary color light, wherein the fifth connecting line is connected to the test color coordinates of the first primary color light and the test color coordinates of the second primary color light or to the test color coordinates of the first primary color light and the test color coordinates of the third primary color light, and the sixth connecting line is connected to the target color coordinates and the target white balance color temperatures of the first primary color light; and acquiring eye tristimulus values corresponding to the test color coordinates of the plurality of primary color lights, and calculating adjustment coefficients of three primary colors corresponding to the first primary color light according to the eye tristimulus values corresponding to the test color coordinates of the plurality of primary color lights and the calibrated color coordinates of the first primary color light.

An embodiment of the present disclosure further provides a processing device, including: a processor and a memory storing a computer program that is runnable on the processor, wherein when the processor executes the program, steps of the color coordinate calibration methods as previously described are implemented.

An embodiment of the present disclosure further provides a color coordinate calibration system, which includes a display module, an optical test device, and a processing device as previously described, wherein the display module includes a display panel and a light source module, the light source module emits a plurality of primary color lights; and the optical test device is configured to measure a chromaticity of the display panel.

An embodiment of the present disclosure further provides a computer readable storage medium for storing executable instructions, wherein steps of the color coordinate calibration method as described in any one of the above items may be implemented when the executable instructions are executed by a processor.

Other aspects may be comprehended upon reading and understanding drawings and detailed descriptions.

BRIEF DESCRIPTION OF DRAWINGS

Accompanying drawings are used for providing further understanding for technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of various components in the drawings do not reflect actual scales, and are only intended to schematically illustrate contents of the present disclosure.

DETAILED DESCRIPTION

To make objectives, technical solutions, and advantages of the present disclosure clearer, the embodiments of the present disclosure will be described in detail with reference to the accompanying drawings. It is to be noted that the embodiments in the present disclosure and features in the embodiments may be randomly combined with each other if there is no conflict.

Unless otherwise defined, technical terms or scientific terms publicly used in the embodiments of the present disclosure should have usual meanings understood by those of ordinary skill in the art to which the present disclosure belongs. "First", "second", and similar terms used in the embodiments of the present disclosure do not represent any order, quantity, or importance, but are only used for distinguishing different components. "Include", "contain", or a similar term means that an element or object appearing before the term covers an element or object and equivalent thereof listed after the term and does not exclude other elements or objects.

The Grade 1A High-Dynamic Range (HDR) monitor, which is the artistic director in the production of radio professional programs, is honored as the crown jewel in the display industry. Different from ordinary display on input port, it needs to support Serial Digital Interface (SDI) input. Functionally, it needs to support waveform, vector, histogram display, pseudo-color, auxiliary focusing, zebra crossing and other functions. It also has clear requirements for image quality parameters, such as brightness, contrast, color, color gamut, etc. Besides, different from ordinary displays, it has strict requirements for color accuracy, gray scale restoration, color scale restoration, ΔE deviation, mixed Gamma, low gray scale gamut, etc.

Figure 1:
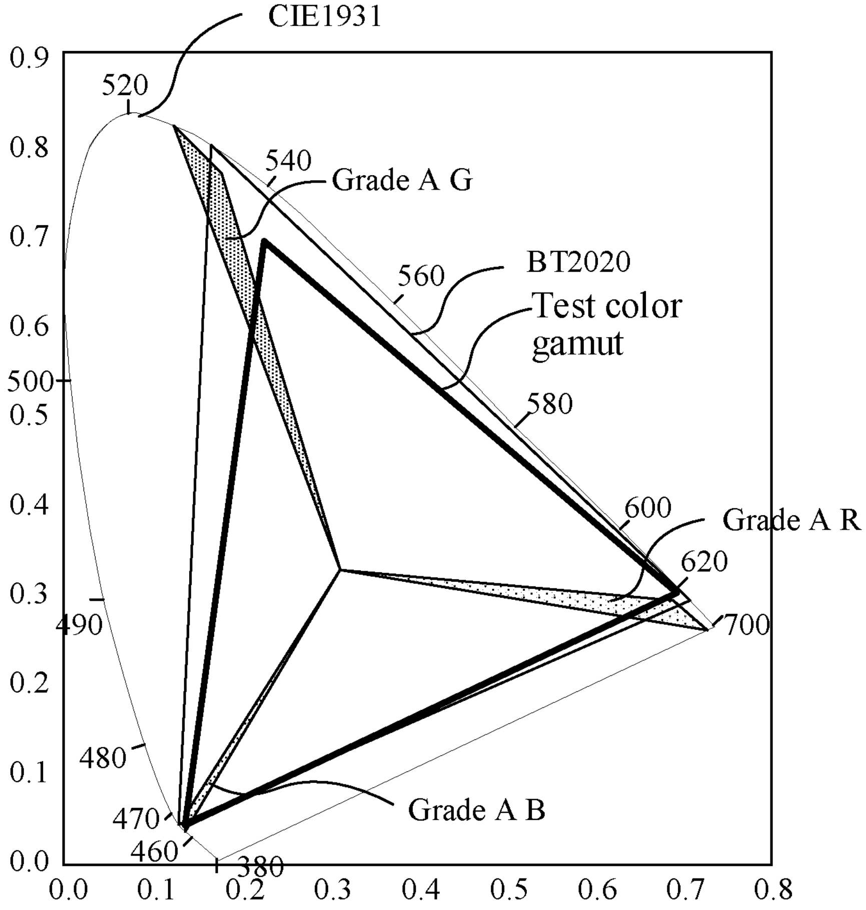
FIG. 1 is a schematic diagram of a color gamut test of a display panel.

Regarding the part of color accuracy, besides solving the problem that the R/G/B primary color wavelength of the light source module itself deviates from the standard, it is also needed to solve the problem of single unit difference, so that the product display can meet the color standard problem in subjective detection of 32 color points ($\Delta E<1$) and the color accuracy problem in subjective evaluation. Some products have the problem of color accuracy deviation, which is mainly manifested in the color distortion of display screen under some color scales, such as leaf color distortion under some color scales, skin color distortion under some color scales and so on. As shown in FIG. 1, in a test color gamut of a display panel, the shift of green and red spectra occurs, which corresponds to the subjective distortion of leaf color and skin color.

Figure 2:
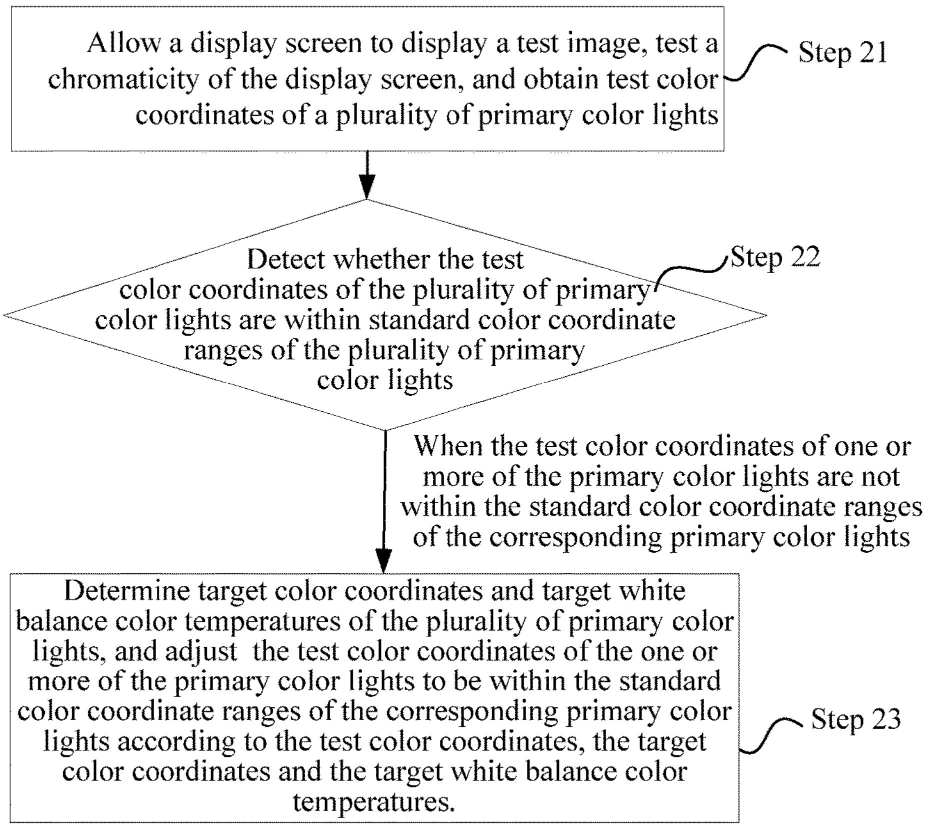
FIG. 2 is a schematic flowchart of a color coordinate calibration method according to an embodiment of the present disclosure.

As shown in FIG. 2, an embodiment of the present disclosure provides a color coordinate calibration method, which includes the following steps:

Step 21: enabling a display screen to display a test image, testing a chromaticity of the display screen, and obtaining test color coordinates of a plurality of primary color lights;

Step 22: detecting whether the test color coordinates of the plurality of primary color lights are within a standard color coordinate range of the plurality of primary color lights; and Step 23: determining target color coordinates and target white balance color temperatures of the plurality of primary color lights when the test color coordinates of one or more of the primary color lights are not within the standard color coordinate range of the corresponding primary color lights, and adjusting the test color coordinates of the one or more of the primary color lights to be within the standard color coordinate range of the corresponding primary color lights according to the test color coordinates, the target color coordinates and the target white balance color temperatures.

In view of the color standard problem, the most fundamental problem is the wavelength deviation of primary color. Of course, in order to meet the requirements of product specifications, it is needed to cooperate with mixed Gamma adjustment and data accuracy processing. However, Gamma adjustment and data accuracy processing are auxiliary means to solve the color standard problem. If R/G/B primary color is not in the required range, it is difficult to meet the requirements of product color standard no matter how to adjust. According to the color coordinate calibration method provided by the embodiment of the present disclosure, by adjusting the test color coordinates of one or more of the primary color lights to be within the standard color coordinate range of the corresponding primary color lights according to the test color coordinates, the target color coordinates and the target white balance color temperatures, a single display panel may be adjusted conveniently and quickly, and the brightness loss and color gamut coverage loss are minimized. The effects of low gray scale color saturation and data processing accuracy (bit number) on color standards are beyond the scope of the present disclosure.

In an exemplary embodiment, the primary color lights include a first primary color light, a second primary color light, and a third primary color light, and the standard color coordinate range includes a primary color wavelength requirement range for broadcast-grade professional monitors under the BT2020 color gamut. BT2020 color gamut is the most extensive color gamut standard in the current mainstream standards, and the primary color wavelength requirement range for broadcast-grade professional monitors is industry standard.

Exemplarily, the first primary color light is blue primary color light, the second primary color light is green primary color light, and the third primary color light is red primary color light.

Broadcast-grade professional monitors have strict requirements on image quality because they are used for content monitoring in program production. They are honored as the crown jewel in the display specialty, and their display indexes are much higher than those of ordinary monitors. Their requirements for color gamut are as follows:

1. The color gamut requirements meet BT2020 color gamut;

2. White dot requirements: D65 white (0.3127, 0.3290);

3. Primary color wavelength requirements:

1) The color coordinate boundary values corresponding to the red primary color light of Grade 1A are the wavelength regions corresponding to the bold areas (underlined) shown in Table 1 below:

TABLE 1

| | Grade 1A | | | | Grade 1b and Grade 2 | | | |
|---|---|---|---|---|---|---|---|---|
| Red | x | y | u' | v' | x | y | u' | v' |
| R0 | BT.2020 | | | | BT.2020 | | | |
| | 0.7080 | 0.2920 | 0.5566 | 0.5165 | 0.7080 | 0.2920 | 0.5566 | 0.5165 |
| R1 | 624.9 nm | | | | 613.2 nm | | | |
| | **0.7005** | **0.2994** | 0.5397 | 0.5190 | 0.6754 | 0.3244 | 0.4875 | 0.5268 |
| R2 | | | | | 700 nm | | | |
| | **0.7347** | **0.2653** | 0.6234 | 0.5065 | 0.7347 | 0.2653 | 0.6234 | 0.5065 |
| R3 | **0.7263** | **0.2614** | 0.6202 | 0.5022 | 0.7263 | 0.2614 | 0.6202 | 0.5022 |
| R4 | **0.6877** | **0.2939** | 0.5340 | 0.5135 | 0.6569 | 0.3166 | 0.4790 | 0.5195 |

Figure 3:
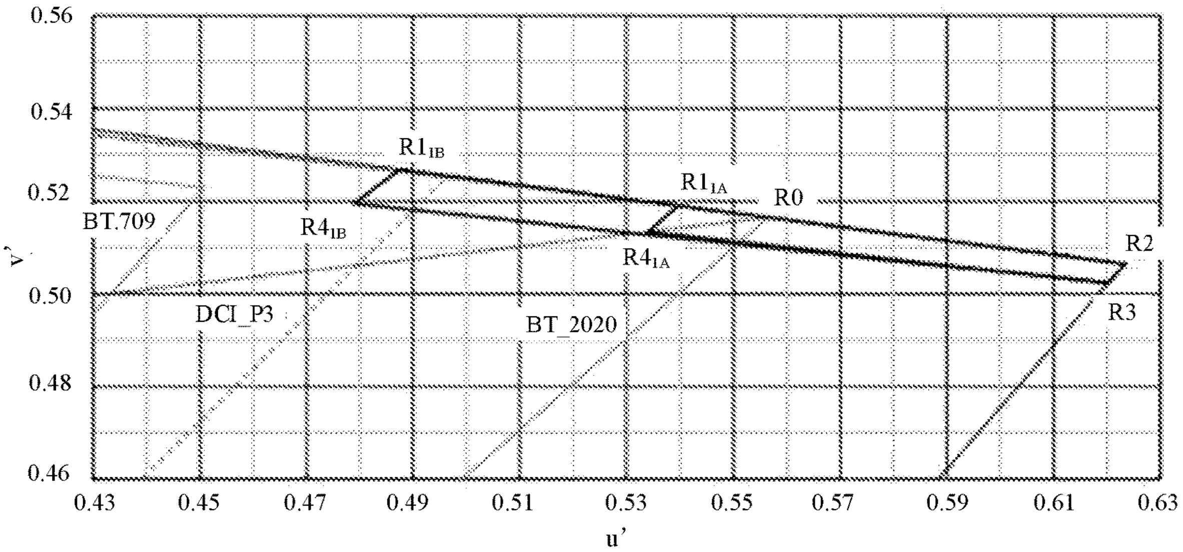
FIG. 3 is a schematic diagram of a requirement range of a red primary color wavelength for a broadcast-grade professional monitor.

FIG. 3 is a schematic diagram of a requirement range of the red primary color wavelength for a broadcast-grade professional monitor. As shown in FIG. 3, the abscissa is chromaticity u' and the ordinate is chromaticity v'.

2) The color coordinate boundary values corresponding to the green primary color light of Grade 1A are the wavelength regions corresponding to the bold areas (underlined) shown in Table 2 below:

TABLE 2

| | Grade 1A | | | | Grade 1b and Grade 2 | | | |
|---|---|---|---|---|---|---|---|---|
| Green | x | y | u' | v' | x | y | u' | v' |
| G0 | BT.2020 | | | | BT.2020 | | | |
| | 0.1700 | 0.7970 | 0.0556 | 0.5868 | 0.1700 | 0.7970 | 0.0556 | 0.5868 |
| G1 | 526.5 nm | | | | 517.6 nm | | | |
| | **0.1262** | **0.8210** | 0.0401 | 0.5864 | 0.0568 | 0.8279 | 0.0177 | 0.5812 |
| G2 | 533.0 nm | | | | 536.8 nm | | | |
| | **0.1783** | **0.7914** | 0.0587 | 0.5867 | 0.2063 | 0.7720 | 0.0696 | 0.5863 |
| G3 | **0.1773** | **0.7730** | 0.0595 | 0.5836 | 0.2022 | 0.6915 | 0.0742 | 0.5713 |

Figure 4:
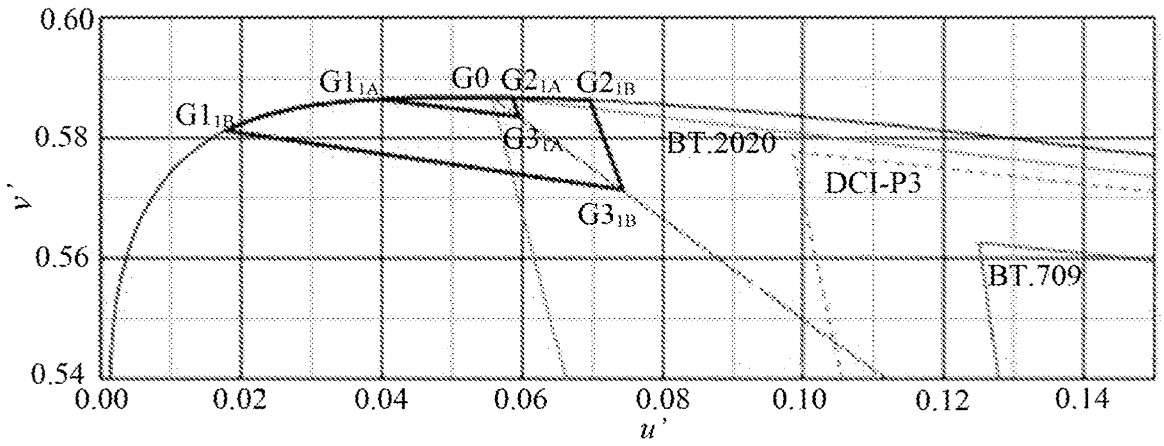
FIG. 4 is a schematic diagram of a requirement range of a green primary color wavelength for a broadcast-grade professional monitor.

FIG. 4 is a schematic diagram of a requirement range of the green primary color wavelength for a broadcast-grade professional monitor. As shown in FIG. 4, the abscissa is chromaticity u' and the ordinate is chromaticity v'.

3) The color coordinate boundary values corresponding to the blue primary color light of Grade 1A are the wavelength regions corresponding to the bold areas (underlined) shown in Table 3 below:

TABLE 3

| | Grade 1A | | | | Grade 1b and Grade 2 | | | |
|---|---|---|---|---|---|---|---|---|
| Blue | x | y | u' | v' | x | y | u' | v' |
| B0 | BT.2020 | | | | BT.2020 | | | |
| | 0.1310 | 0.0460 | 0.1593 | 0.1258 | 0.1310 | 0.0460 | 0.1593 | 0.1258 |
| B1 | 463.1 nm | | | | 461.2 nm | | | |
| | **0.1390** | **0.0353** | 0.1768 | 0.1010 | 0.1421 | 0.0317 | 0.1836 | 0.0921 |
| B2 | 467.8 nm | | | | 467.8 nm | | | |
| | **0.1295** | **0.0487** | 0.1558 | 0.1318 | 0.1295 | 0.0487 | 0.1558 | 0.1318 |
| B3 | | | | | BT.709 | | | |
| | **0.1400** | **0.0545** | 0.1660 | 0.1454 | 0.1500 | 0.0600 | 0.1754 | 0.1579 |

Figure 5A:
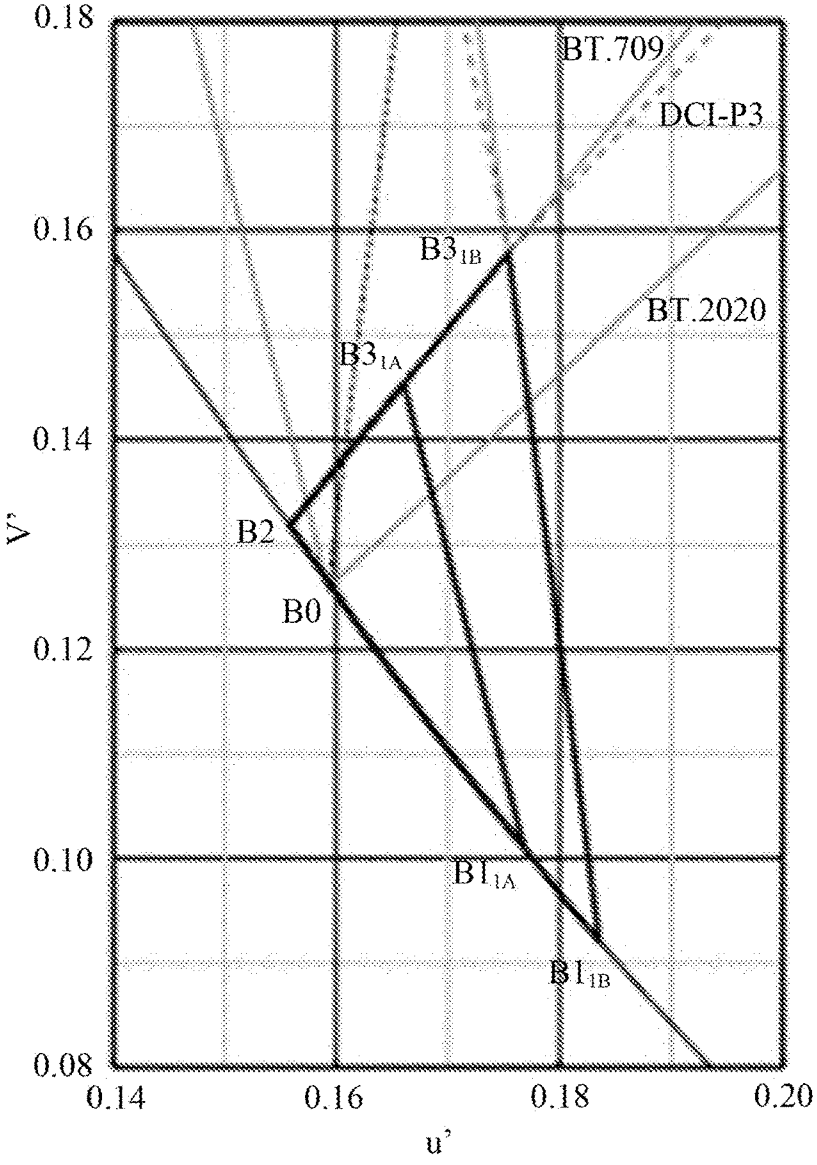
FIGS. 5*a* and 5*b* are schematic diagrams of two requirement ranges of a blue primary color wavelength for a broadcast-grade professional monitor.
Figure 5B:
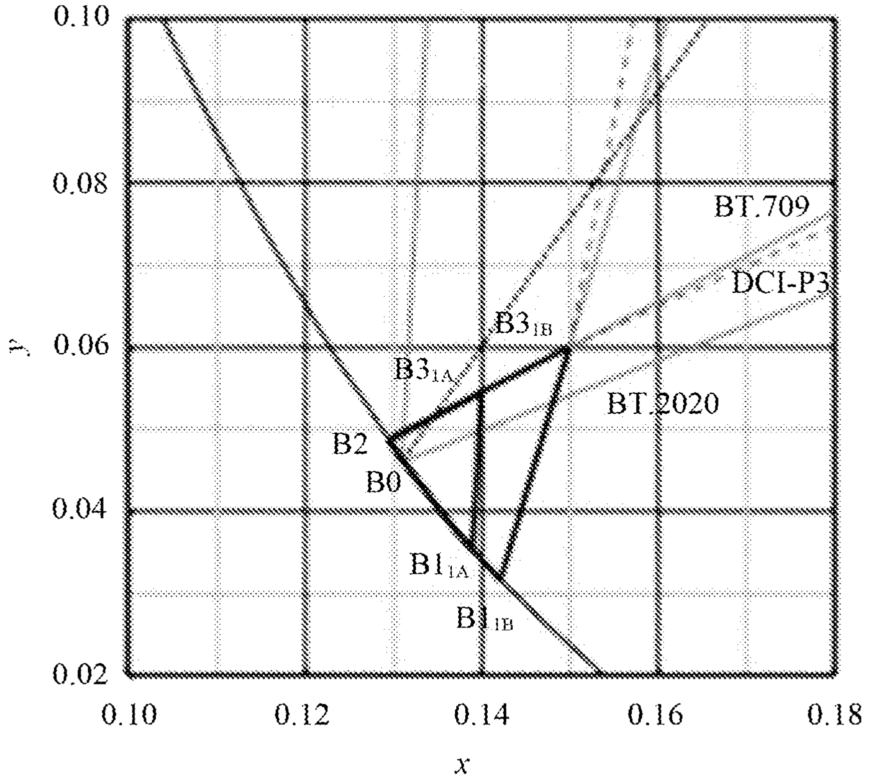

FIGS. **5*a* and 5*b* are schematic diagrams of requirement ranges of the blue primary color wavelength for a broadcast-grade professional monitor. As shown in FIG. 5*a*, the abscissa is chromaticity u', and the ordinate is chromaticity v'. As shown in FIG. 5*b***, the abscissa is color coordinate x, and the ordinate is color coordinate y.

In an exemplary embodiment, the method further includes beforehand:

adjusting a brightness of the display screen to a first brightness which is 50 to 100 nit higher than a preset target brightness.

Because the color coordinates of the display screen before calibration have offset, the peak brightness will decrease after calibration. Therefore, it is needed to pre-adjust the brightness of the display screen to be higher before calibration. The farther the color coordinates of the display screen before calibration are offset, the more the brightness of the display screen will decrease after calibration. Therefore, in order to ensure that the peak brightness after calibration reaches the target brightness, it is needed to pre-adjust the brightness of the display screen to be higher.

Exemplarily, the first brightness is 1050 to 1100 nit and the target brightness is 1000 nit.

In an exemplary embodiment, when the display screen is stable half an hour after it is turned on, the chromaticity of the display screen is tested to obtain test color coordinates of a plurality of primary color lights.

In an exemplary embodiment, the test color coordinates of the first primary color light are (x10, y10, a10), the test color coordinates of the second primary color light are (x20, y20, z20), and the test color coordinates of the third primary color light are (x30, y30, z30), where x10+y10+z10=1, x20+y20+z20=1, and x30+y30+z30=1.

Exemplarily, data of X, Y, Z, x and y that are stable half an hour after the display screen is turned on are captured and data of z is supplemented. As shown in Table 4 below, the test color coordinates of the third primary color light are (0.6928, 0.3029, 0.0043), the test color coordinates of the second primary color light are (0.2252, 0.6913, 0.0835), and the test color coordinates of the first primary color light are (0.1378, 0.0427, 0.8195).

In an exemplary embodiment, the test color coordinates of the first primary color light are within the standard color coordinate range of the first primary color light, the test color coordinates of the second primary color light are outside the standard color coordinate range of the second primary color light, S11=0, S12=0, S13=1, S21=0, S22=1, S23 is a number greater than 0 and less than 1.

In an exemplary embodiment, the test color coordinates of the first primary color light are within the standard color coordinate range of the first primary color light, the test color coordinates of the third primary color light are outside the standard color coordinate range of the third primary color light, S11=0, S12=0, S13=1, S31=1, S32=0, S33 is a number greater than 0 and less than 1.

TABLE 4

| Serial number | X | Y | Z | x | y | z | Lv | u' | v' |
|---|---|---|---|---|---|---|---|---|---|
| 1 | 558.0825 | 244 | 3.463849 | 0.6928 | 0.3029 | 0.0043 | 244 | 0.527928 | 0.519336 |
| 2 | 253.4111 | 777.9 | 93.96015 | 0.2252 | 0.6913 | 0.0835 | 777.9 | 0.08306 | 0.573682 |
| 3 | 208.0877 | 64.48 | 1237.503 | 0.1378 | 0.0427 | 0.8195 | 64.48 | 0.170292 | 0.118728 |

In an exemplary embodiment, output display parameter=adjustment matrix*input display parameter, where the output display parameter is the calibrated color coordinates of a plurality of primary color lights, the input display parameter is the test color coordinates of the plurality of primary color lights, and the adjustment matrix is $$\begin{pmatrix} S31 & S32 & S33 \\ S21 & S22 & S23 \\ S11 & S12 & S13 \end{pmatrix},$$

where (S31, S32, S33) are adjustment coefficients of three primary colors corresponding to the third primary color light, (S21, S22, S23) are adjustment coefficients of three primary colors corresponding to the second primary color light, (S11, S12, S13) are adjustment coefficients of three primary colors corresponding to the first primary color light, at least one of S31, S22 and S13 is 1, and S31, S32, S33, S21, S22, S23, S11, S22 and S23 are all numbers greater than or equal to 0 and less than or equal to 1.

Exemplarily, the output display parameter is $$\begin{pmatrix} R' \\ G' \\ B' \end{pmatrix},$$

and the input display parameter is $$\begin{pmatrix} R \\ G \\ B \end{pmatrix},$$

namely:

$$\begin{pmatrix} R' \\ G' \\ B' \end{pmatrix} = \begin{pmatrix} S31 & S32 & S33 \\ S21 & S22 & S23 \\ S11 & S12 & S13 \end{pmatrix} * \begin{pmatrix} R \\ G \\ B \end{pmatrix}$$

In an exemplary embodiment, determining the target color coordinates of the primary color lights of the display screen includes:

acquiring a color coordinate boundary value corresponding to the primary color light; and determining the color coordinate boundary value which is closest to the test color coordinate corresponding to the primary color light as the target color coordinate of the primary color light.

Figure 6A:
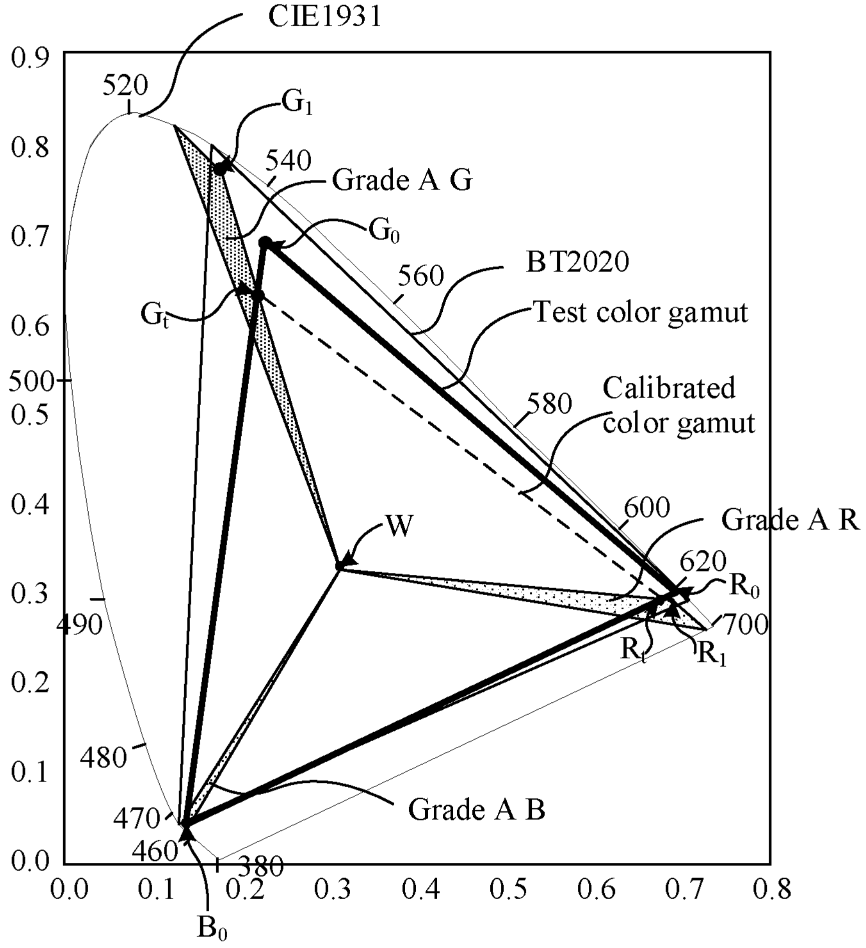
FIG. 6*a* is a schematic diagram of a color gamut after calibration of a display panel according to an embodiment of the present disclosure.

As shown in FIG. 6*a*, the test color coordinates of blue primary color light is within the standard color coordinate range of blue primary color light, the test color coordinates of green primary color light are outside the standard color coordinate range of green three primary color light, and the test color coordinates of the red primary color light are outside the standard color coordinate range of the red three primary color light. Therefore, the test color coordinates of the green primary color light are adjusted to be within the standard color coordinate range of the green primary color light, and the test color coordinates of the red primary color light are adjusted to be within the standard color coordinate range of the red primary color light.

In an exemplary embodiment, the target color coordinates of the second primary color light are determined to be (x21, y21) and the target color coordinates of the third primary color light are determined to be (x31, y31). Exemplarily, as shown in FIG. 6*a*, the target color coordinates of the green primary color light are point G1 and its color coordinates are (0.1773, 0.7730), i.e., values of G3 and grade 1A in Table 2. The target color coordinates of the red primary color light are point R1, and its color coordinates are (0.6887, 0.2939), i.e. values of R4 and Grade 1A in Table 1.

In an exemplary embodiment, as shown in FIG. 6*a*, the target white balance color temperature is point W, and its color coordinates are (0.3127, 0.3290).

In an exemplary embodiment, adjusting the test color coordinates of one or more of the primary color lights to be within the standard color coordinate range of the corresponding primary color lights according to the test color coordinates, the target color coordinates and the target white balance color temperatures includes:

calculating an intersection coordinate of a first connecting line and a second connecting line in a color gamut space, and using the intersection coordinate of the first connecting line and the second connecting line as a calibrated color coordinate of the second primary color light, wherein the first connecting line is connected to the test color coordinate of the first primary color light and the test color coordinate of the second primary color light or connected to the test color coordinate of the third primary color light and the test color coordinate of the second primary color light, and the second connecting line is connected to the target color coordinate and the target white balance color temperature of the second primary color light; and acquiring eye tristimulus values corresponding to the test color coordinates of the plurality of primary color lights, and calculating adjustment coefficients of three primary colors corresponding to the second primary color light according to the eye tristimulus values corresponding to the test color coordinates of the plurality of primary colors and the calibrated color coordinate of the second primary color light.

In an exemplary embodiment, the first connecting line is connected to the test color coordinates of the first primary color light and the test color coordinates of the second primary color light when the test color coordinates of the second primary color light (green primary color light) are located to the right of the green primary color wavelength requirement range for a broadcast-grade professional monitor; and the first connecting line is connected to the test color coordinates of the third primary color light and the test color coordinates of the second primary color light when the test color coordinates of the second primary color light (green primary color light) are located to the left of the green primary color wavelength requirement range for a broadcast-grade professional monitor.

In an exemplary embodiment, the test color coordinates of the first primary color light are (x10, y10), the test color coordinates of the second primary color light are (x20, y20), the target color coordinates of the second primary color light are (x21, y21), the target white balance color temperature is (xw1, yw1), and the calibrated color coordinates of the second primary color light are calculated as (x2t, y2t) according to the following formula:

$$(x2t-x10)/(x20-x10)=(y2t-y10)/(y20-y10) \tag{1}$$

$$(x2t-xw1)/(x21-xw1)=(y2t-yw1)/(y21-yw1). \tag{2}$$

Exemplarily, by substituting the aforementioned test color coordinates, target color coordinates and target white balance color temperature into the formulas (1) and (2), it is possible to obtain:

$$(x2t–0.1378)/(0.2252–0.1378)–(y2t–0.0472)/(0.6913–0.0472);$$

$$(x2t–0.3127)/(0.1773–0.3127)–(y2t–0.3290)/(0.7730–0.3290);$$

the results are x2t=0.219 and y2t=0.639.

Because x2t+y2t+z2t=1, thus z2t=0.142.

In an exemplary embodiment, eye tristimulus values corresponding to the test color coordinates of the first primary color light are (X10, Y10, Z10), eye tristimulus values corresponding to the test color coordinates of the second primary color light are (X20, Y20, Z20), eye tristimulus values corresponding to the test color coordinates of the third primary color light are (X30, Y30, Z30), and the calibrated color coordinates of the second primary color light are (X2t, Y2t, Z2t), and adjustment coefficients (S21, S22, S23) of three primary colors corresponding to the second primary color light are calculated according to the following formulas:

$$x2t=(S21*X10+S22*X20+S23*X30)/S; \tag{3}$$

$$y2t=(S21*Y10+S22*Y20+S23*Y30)/S; \tag{4}$$

$$z2t=(S21*Z10+S22*Z20+S23*Z30)/S; \tag{5}$$

where S is a constant, which may be eliminated in the calculation process.

Still taking the test color coordinate, the target color coordinate and the target white balance color temperature as examples, referring to Table 4, the eye tristimulus values corresponding to the test color coordinates of the first primary color light are (208.88, 64.48, 1237.5), the eye tristimulus values corresponding to the test color coordinates of the second primary color light are (253.4, 777.9, 93.96), the human eye tristimulus values corresponding to the test color coordinates of the third primary color light are (558.08, 244, 3.46), the human eye tristimulus values corresponding to the test color coordinates of the first primary color light, the second primary color light and the third primary color light, and the calibrated color coordinates of the second primary color light are substituted into the above formulas (3), (4) and (5), and it is taken that S21=0, then S22=15. 50149*S23 is obtained; it is taken that S22=1, then S23=0.06451.

In an exemplary embodiment, adjusting the test color coordinates of one or more of the primary color lights to be within the standard color coordinate range of the corresponding primary color lights according to the test color coordinates, the target color coordinates and the target white balance color temperatures includes:

calculating an intersection coordinate of a third connecting line and a fourth connecting line in a color gamut space, and using the intersection coordinate of the third connecting line and the fourth connecting line as a calibrated color coordinate of the third primary color light, wherein the third connecting line is connected to the test color coordinate of the first primary color light and the test color coordinate of the third primary color light or connected to the test color coordinate of the second primary color light and the test color coordinate of the third primary color light, and the fourth connecting line is connected to the target color coordinate and the target white balance color temperature of the third primary color light; and acquiring eye tristimulus values corresponding to the test color coordinates of the plurality of primary color lights, and calculating adjustment coefficients of three primary colors corresponding to the third primary color light according to the eye tristimulus values corresponding to the test color coordinates of the plurality of primary color lights and the calibrated color coordinate of the third primary color light.

In an exemplary embodiment, the third connecting line is connected to the test color coordinates of the first primary color light and the test color coordinates of the third primary color light when the test color coordinates of the third primary color light (red primary color light) are located to the upper side of the red primary color wavelength requirement range for a broadcast-grade professional monitor; and the third connecting line is connected to the test color coordinates of the second primary color light and the test color coordinates of the third primary color light when the test color coordinates of the third primary color light (red primary color light) are located to the lower side of the red primary color wavelength requirement range for a broadcast-grade professional monitor.

In an exemplary embodiment, the test color coordinates of the first primary color light are (x10, y10), the test color coordinates of the third primary color light are (x30, y30), the target color coordinates of the third primary color light are (x31, y31), the target white balance color temperature is (xw1, yw1), and the calibrated color coordinates of the third primary color light are calculated as (x3t, y3t) according to the following formula:

$$(x3t-x10)/(x30-x10)=(y3t-y10)/(y30-y10) \quad (6)$$

$$(x3t-x31)/(xw1-x31)=(y3t-y31)/(yw1-y31). \quad (7)$$

Exemplarily, by substituting the aforementioned test color coordinates, target color coordinates and target white balance color temperature into the formulas (6) and (7), it is possible to obtain:

$$(x3t–0.1378)/(0.6928–0.1378)=(y3t–0.0472)/(0.3029–0.0472);$$

$$(x3t–0.6877)/(0.3127–0.6877)–(y3t–0.2939)/(0.3290–0.2939);$$

the results are x3t=0.676 and y3t=0.295.

Because x3t+y3t+z3t=1, thus z3t=0.029.

In an exemplary embodiment, eye tristimulus values corresponding to the test color coordinates of the first primary color light are (X10, Y10, Z10), eye tristimulus values corresponding to the test color coordinates of the second primary color light are (X20, Y20, Z20), eye tristimulus values corresponding to the test color coordinates of the third primary color light are (X30, Y30, Z30), and the calibrated color coordinates of the third primary color light are (x3t, y3t, z3t), and adjustment coefficients (S31, S32, S33) of three primary colors corresponding to the third primary color light are calculated according to the following formulas:

$$x3t=(S31*X10+S32*X20+S33*X30)/S; \quad (8)$$

$$y3t=(S31*Y10+S32*Y20+S33*Y30)/S; \quad (9)$$

$$z3t=(S31*Z10+S32*Z20+S33*Z30)/S; \quad (10)$$

where S is a constant, which may be eliminated in the calculation process.

Still taking the test color coordinate, the target color coordinate and the target white balance color temperature as examples, referring to Table 4, the eye tristimulus values corresponding to the test color coordinates of the first primary color light are (208.88, 64.48, 1237.5), the eye tristimulus values corresponding to the test color coordinates of the second primary color light are (253.4, 777.9, 93.96), the human eye tristimulus values corresponding to the test color coordinates of the third primary color light are (558.08, 244, 3.46), the human eye tristimulus values corresponding to the test color coordinates of the first primary color light, the second primary color light and the third primary color light, and the calibrated color coordinates of the second primary color light are substituted into the above formulas (8), (9) and (10), and it is taken that S32=0, then S31=59.98511*S33 is obtained; it is taken that S31=1, then S33=0.016671 is obtained.

To sum up, $$\begin{pmatrix} S31 & S32 & S33 \\ S21 & S22 & S23 \\ S11 & S12 & S13 \end{pmatrix} = \begin{pmatrix} 1 & 0 & 0.016671 \\ 0 & 1 & 0.06451 \\ 0 & 0 & 1 \end{pmatrix}, \begin{pmatrix} R' \\ G' \\ B' \end{pmatrix} = \begin{pmatrix} 1 & 0 & 0.016671 \\ 0 & 1 & 0.06451 \\ 0 & 0 & 1 \end{pmatrix} * \begin{pmatrix} R \\ G \\ B \end{pmatrix}.$$

In an embodiment of the present disclosure, S21=0, S22=1, S32=0 and S31=1 are made to ensure the color gamut coverage and brightness to the maximum extent after debugging.

Finally, the aforementioned test color coordinates may be substituted into the above formula to verify the results. The test color coordinates of green primary color light are (0.2252, 0.6913, 0.0835), the transformed coordinates of the green primary color light are Gt (0.218236, 0.639625, 0.142139), and the brightness change is $W_{LO}$: 1086.38→$W_{LT1}$: 1090.54. The color gamut reduction and brightness reduction are all relatively small, and at the same time the primary color wavelength requirement range for a 1A broadcast-grade professional monitor is met, which is in line with expectations.

The test color coordinates of the red primary color light are (0.6928, 0.3029, 0.0043), the transformed coordinates of the red primary color light are Rt (0.6759835, 0.295017, 0.028999), and the brightness changes is: $W_{LT1}$: 1090.54→$W_{LT2}$: 1091.61. The color gamut reduction and brightness reduction are all relatively small, and at the same time the primary color wavelength requirement range for a Grade 1A broadcast-grade professional monitor is met, which is also in line with expectations.

Figure 6B:
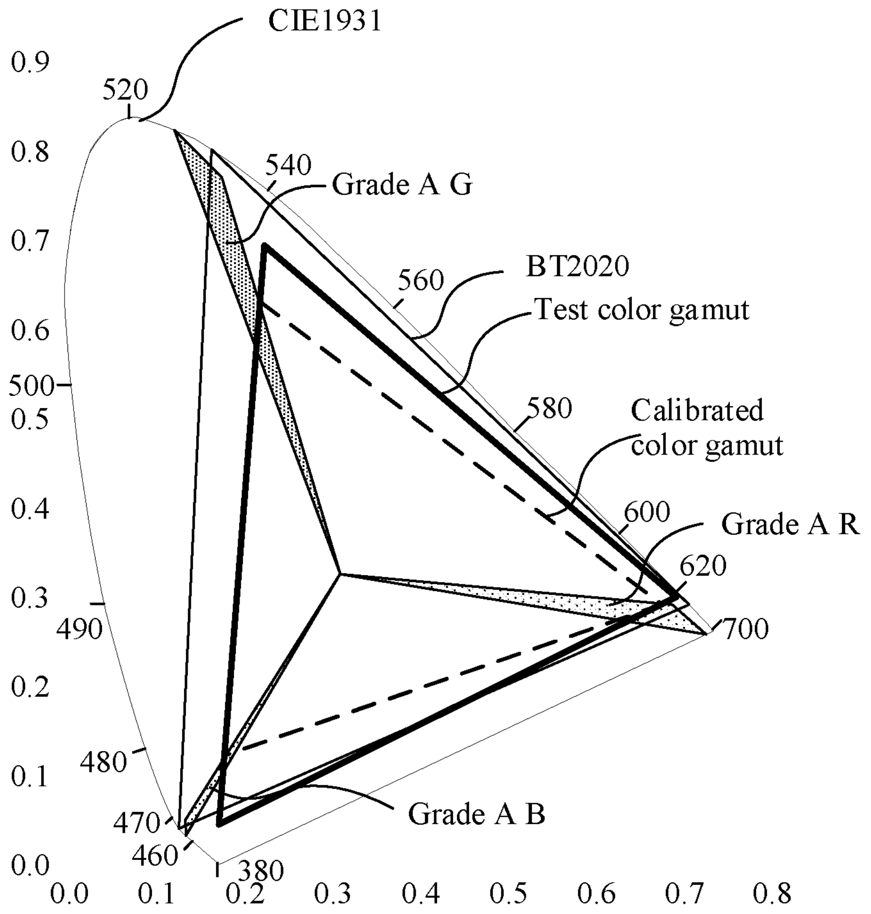
FIG. 6*b* is a schematic diagram of another color gamut after calibration of a display panel according to an embodiment of the present disclosure.

As shown in FIG. 6*b*, when the test color coordinates of the first primary color light are outside the standard color coordinate range of the first primary color light, the test color coordinates of the first primary color light may be adjusted to be within the standard color coordinate range of the first primary color light using a method similar to that described above.

In an exemplary embodiment, adjusting the test color coordinates of one or more of the primary color lights to be within the standard color coordinate range of the corresponding primary color lights according to the test color coordinates, the target color coordinates and the target white balance color temperatures includes:

calculating an intersection coordinate of a fifth connecting line and a sixth connecting line in a color gamut space, and using the intersection coordinate of the fifth connecting line and the sixth connecting line as a calibrated color coordinate of the first primary color light, wherein the fifth connecting line is connected to the test color coordinate of the first primary color light and the test color coordinate of the second primary color light or connected to the test color coordinate of the first primary color light and the test color coordinate of the third primary color light, and the sixth connecting line is connected to the target color coordinate and the target white balance color temperature of the first primary color light; and acquiring eye tristimulus values corresponding to the test color coordinates of the plurality of primary color lights, and calculating adjustment coefficients of three primary colors corresponding to the first primary color light according to the eye tristimulus values corresponding to the test color coordinates of the plurality of primary color lights and the calibrated color coordinate of the first primary color light.

In an exemplary embodiment, the fifth connecting line is connected to the test color coordinates of the first primary color light and the test color coordinates of the third primary color light when the test color coordinates of the first primary color light (blue primary color light) are located to the upper side of the blue primary color wavelength requirement range for a broadcast-grade professional monitor; and the fifth connecting line is connected to the test color coordinates of the first primary color light and the test color coordinates of the third primary color light when the test color coordinates of the first primary color light (blue primary color light) are located to the lower side of the blue primary color wavelength requirement range for a broadcast-grade professional monitor.

As shown in FIG. 6*b*, when the test color coordinates of the first, second, and third primary color lights are all outside the standard color coordinate range of the corresponding primary color light, the test color coordinates of a plurality of primary color lights may be adjusted to be within the standard color coordinate range of the corresponding primary color lights, respectively, using a method similar to that described above. In an exemplary embodiment, the color coordinate calibration method includes the following steps:

determining color coordinate boundary values which are closest to the test color coordinates corresponding to the first primary color light, second primary color light and third primary color light respectively as target color coordinates corresponding to the first primary color light, second primary color light and third primary color light;

calculating an intersection coordinate of a first connecting line and a second connecting line in a color gamut space, and using the intersection coordinate of the first connecting line and the second connecting line as a calibrated color coordinate of the second primary color light, wherein the first connecting line is connected to the test color coordinate of the first primary color light and the test color coordinate of the second primary color light or connected to the test color coordinate of the third primary color light and the test color coordinate of the second primary color light, and the second connecting line is connected to the target color coordinate and the target white balance color temperature of the second primary color light;

acquiring eye tristimulus values corresponding to the test color coordinates of the plurality of primary color lights, and calculating adjustment coefficients of three primary colors corresponding to the second primary color light according to the eye tristimulus values corresponding to the test color coordinates of the plurality of primary color lights and the calibrated color coordinate of the second primary color light;

calculating an intersection coordinate of a third connecting line and a fourth connecting line in a color gamut space, and using the intersection coordinate of the third connecting line and the fourth connecting line as a calibrated color coordinate of the third primary color light, wherein the third connecting line is connected to the test color coordinate of the third primary color light and the test color coordinate of the first primary color light or connected to the test color coordinate of the third primary color light and the test color coordinate of the second primary color light, and the fourth connecting line is connected to the target color coordinate and the target white balance color temperature of the third primary color light; and acquiring eye tristimulus values corresponding to the test color coordinates of the plurality of primary color lights, and calculating adjustment coefficients of three primary colors corresponding to the third primary color light according to the eye tristimulus values corresponding to the test color coordinates of the plurality of primary colors and the calibrated color coordinate of the third primary color light;

calculating an intersection coordinate of a fifth connecting line and a sixth connecting line in a color gamut space, and using the intersection coordinate of the fifth connecting line and the sixth connecting line as a calibrated color coordinate of the first primary color light, wherein the fifth connecting line is connected to the test color coordinate of the first primary color light and the test color coordinate of the second primary color light or connected to the test color coordinate of the first primary color light and the test color coordinate of the third primary color light, and the sixth connecting line is connected to the target color coordinate and the target white balance color temperature of the first primary color light; and acquiring eye tristimulus values corresponding to the test color coordinates of the plurality of primary color lights, and calculating adjustment coefficients of three primary colors corresponding to the first primary color light according to the eye tristimulus values corresponding to the test color coordinates of the plurality of primary colors and the calibrated color coordinate of the first primary color light.

Generally, in practical application, by adjusting the color block of the light source, the test color coordinates of one primary color light are first satisfied to be within the standard color coordinate range of the corresponding primary color light, and then the test color coordinates of other primary color lights are adjusted to be within the standard color coordinate range of the corresponding primary color light by the color coordinate calibration method disclosed in the present disclosure.

According to the color coordinate calibration method provided by the embodiment of the present disclosure, by adjusting the test color coordinates of one or more of the primary color lights to be within the standard color coordinate range of the corresponding primary color lights according to the test color coordinates, the target color coordinates and the target white balance color temperatures, a single display panel may be adjusted conveniently and quickly, and the brightness loss and color gamut coverage loss are minimized.

An embodiment of the present disclosure further provides a processing device, which may include a processor and a memory storing a computer program that is runnable on the processor, wherein when the processor executes the computer program, steps of the color coordinate calibration method according to any one of the preceding items in the present disclosure are implemented.

Figure 7:
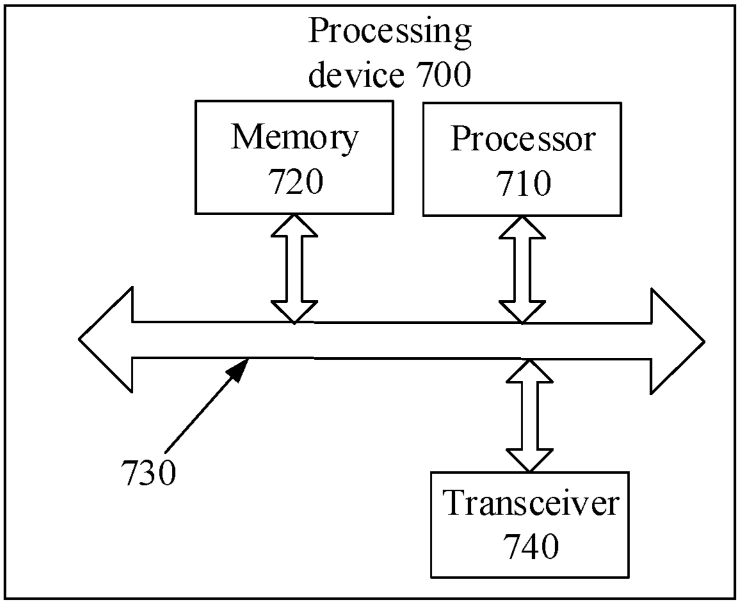
FIG. 7 is a schematic structural diagram of a processing device according to an embodiment of the present disclosure.

As shown in FIG. 7, in an example, a processing device 700 may include: a processor 710, a memory 720, a bus system 730, and a transceiver 740, wherein the processor

710, the memory 720, and the transceiver 740 are connected via the bus system 730, the memory 720 is configured to store instructions, and the processor 710 is configured to execute the instructions stored in the memory 720 to control the transceiver 740 to send signals. In an exemplary embodiment, the transceiver 740 may capture optical data for testing from an optical test device under the control of the processor 710, and quickly and conveniently calculate the coefficients of the third-order conversion matrix according to the captured optical data, then carry out gamma white balance calibration, and send a notification to other devices through the transceiver after meeting the customer's requirements for color standard.

It should be understood that the processor 710 may be a Central Processing Unit (CPU), or the processor 710 may be another general-purpose processor, a digital signal processor (DSP), an application specific integrated circuit (ASIC), a field programmable gate array (FPGA), or another programmable logic device, a discrete gate or a transistor logic device, a discrete hardware component, etc. A general-purpose processor may be a microprocessor or the processor may be any conventional processor, etc.

The memory 720 may include a read-only memory and a random access memory, and provides instructions and data to the processor 710. A portion of the memory 720 may include a non-volatile random access memory. For example, the memory 720 may store information of a device type.

The bus system 730 may include a power bus, a control bus, a status signal bus, or the like in addition to a data bus. However, for clarity of illustration, various buses are all denoted as the bus system 730 in FIG. 7.

In an implementation process, processing performed by the processing device may be completed by an integrated logic circuit of hardware in the processor 710 or instructions in a form of software. That is, the steps of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory, or an electrically erasable programmable memory, or a register, etc. The storage medium is located in the memory 720. The processor 710 reads information in the memory 720, and completes the steps of the above method in combination with its hardware. In order to avoid repetition, detailed description is not provided herein.

An embodiment of the present disclosure further provides a color coordinate calibration system, including a display module, an optical test device and a processing device. The processing device may be the processing device 1500 as described above. The display module includes a display panel and a light source module, wherein the light source module emits a plurality of primary color lights; and the optical test device is configured to measure a chromaticity of the display panel.

In an exemplary embodiment, the display panel may be a Liquid Crystal Display (LCD) panel or a Light Emitting Diode (LED) display panel.

In an exemplary embodiment, the light emitting diode display panel may be a Mini LED display panel or an Organic Light Emitting Diode (OLED) display panel.

According to the present disclosure, in liquid crystal display products (which can be understood as a white light source), color coordinates of the primary color lights are adjusted by controlling the RBG driving excitation of the liquid crystal screen so as to meet the shift of the color coordinates of the primary color lights. For mini LED display or OLED display (which can be understood as the display in which RGB are light emitted separately), the color coordinates of the primary color lights may be shifted by RGB proportioning method, but the matrix coefficients need to be converted to control the luminous duty of monochrome R/G/B.

An embodiment of the present disclosure further provides a computer readable storage medium, in which executable instructions are stored, wherein when the executable instructions are executed by a processor, the color coordinate calibration method provided by any embodiment of the present disclosure may be implemented. The color coordinate calibration method may be used to quickly and conveniently calculate the coefficients of the third-order conversion matrix when calibrating the display screen, and then carry out Gamma white balance calibration to meet the requirements of customers for color standards. The method for driving the color coordinate calibration system by executing executable instructions so as to perform color coordinate calibration is substantially the same as the color coordinate calibration method provided in the above embodiments of the present disclosure, and it will not be described in detail here.

It can be understood by those of ordinary skill in the art that all or some certain steps in the method disclosed above and function modules/units in the system and the apparatus may be implemented as software, firmware, hardware, and proper combinations thereof. In a hardware implementation mode, division of the function modules/units mentioned in the above description is not always division corresponding to physical components. For example, a physical component may have multiple functions, or several physical components may cooperate to execute a function or a step. Some certain components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or other magnetic storage apparatuses, or any other medium that may be configured to store desired information and may be accessed by a computer. In addition, it is known to those of ordinary skill in the art that the communication medium usually includes a computer-readable instruction, a data structure, a program module, or other data in a modulated data signal, such as, a carrier or other transmission mechanisms, and may include any information delivery medium.

Although the embodiments disclosed in the present disclosure are as above, the described contents are only embodiments used for convenience of understanding the present disclosure and are not intended to limit the present disclosure. Any person skilled in the art to which the present disclosure pertains may make any modifications and variations in the form and details of implementations without departing from the spirit and the scope of the present disclosure, but the protection scope of the present disclosure shall still be subject to the scope defined in the appended claims.

The invention claimed is:

1. A color coordinate calibration method, comprising:

allowing a display screen to display a test image, testing a chromaticity of the display screen, and obtaining test color coordinates of a plurality of primary color lights;

detecting whether the test color coordinates of the plurality of primary color lights are within a standard color coordinate range of the plurality of primary color lights; and determining target color coordinates and target white balance color temperatures of the plurality of primary color lights in a case that the test color coordinates of one or more of the primary color lights are not within the standard color coordinate ranges of the corresponding primary color lights, and adjusting the test color coordinates of the one or more of the primary color lights to be within the standard color coordinate ranges of the corresponding primary color lights according to the test color coordinates, the target color coordinates and the target white balance color temperatures, wherein adjusting the test color coordinates of the one or more of the primary color lights to be within the standard color coordinate ranges of the corresponding primary color lights according to the test color coordinates, the target color coordinates and the target white balance color temperatures, comprises:

calculating coordinates of an intersection of a first connecting line and a second connecting line in a color gamut space, and using the intersection coordinates of the first connecting line and the second connecting line as calibrated color coordinates of a second primary color light, wherein the first connecting line is connected to test color coordinates of a first primary color light and test color coordinates of the second primary color light or connected to the test color coordinates of the first primary color light and test color coordinates of a third primary color light, and the second connecting line is connected to target color coordinates and target white balance color temperatures of the second primary color light; and acquiring eye tristimulus values corresponding to the test color coordinates of the plurality of primary color lights, and calculating adjustment coefficients of three primary colors corresponding to the second primary color light according to the eye tristimulus values corresponding to the test color coordinates of the plurality of primary color lights and the calibrated color coordinates of the second primary color light, or wherein adjusting the test color coordinates the one or more of the primary color lights to be within the standard color coordinate ranges of the corresponding primary color lights according to the test color coordinates, the target color coordinates and the target white balance color temperatures, comprises:

calculating coordinates of an intersection of a third connecting line and a fourth connecting line in a color gamut space, and using the intersection coordinates of the third connecting line and the fourth connecting line as calibrated color coordinates of a third primary color light, wherein the third connecting line is connected to test color coordinates of a first primary color light and test color coordinates of the third primary color light or connected to test color coordinates of a second primary color light and the test color coordinates of the third primary color light, and the fourth connecting line is connected to target color coordinates and the target white balance color temperatures of the third primary color light; and acquiring eye tristimulus values corresponding to the test color coordinates of the plurality of primary color lights, and calculating adjustment coefficients of three primary colors corresponding to the third primary color light according to the eye tristimulus values corresponding to the test color coordinates of the plurality of primary color lights and the calibrated color coordinates of the third primary color light, or wherein adjusting the test color coordinates of the one or more of the primary color lights to be within the standard color coordinate ranges of the corresponding primary color lights according to the test color coordinates, the target color coordinates and the target white balance color temperatures, comprises:

calculating coordinates of an intersection of a fifth connecting line and a sixth connecting line in a color gamut space, and using the intersection coordinates of the fifth connecting line and the sixth connecting line as calibrated color coordinates of a first primary color light, wherein the fifth connecting line is connected to test color coordinates of the first primary color light and test color coordinates of a second primary color light or connected to the test color coordinates of the first primary color light and test color coordinates of a third primary color light, and the sixth connecting line is connected to target color coordinates and target white balance color temperatures of the first primary color light; and acquiring eye tristimulus values corresponding to the test color coordinates of the plurality of primary color lights, and calculating adjustment coefficients of three primary colors corresponding to the first primary color light according to the eye tristimulus values corresponding to the test color coordinates of the plurality of primary color lights and the calibrated color coordinates of the first primary color light.

2. The color coordinate calibration method according to claim 1, wherein the primary color lights comprises a first primary color light, a second primary color light, and a third primary color light, and the standard color coordinate ranges comprise a primary color wavelength requirement ranges for broadcast-grade professional monitors under BT2020 color gamut.

3. The color coordinate calibration method according to claim 1, wherein determining the target color coordinates of the primary color lights of the display screen comprises:

acquiring a color coordinate boundary value corresponding to a primary color light; and determining a color coordinate boundary value which is closest to a test color coordinate corresponding to the primary color light as a target color coordinate of the primary color light.

4. The color coordinate calibration method according to claim 1, wherein the test color coordinates of the first primary color light are (x10, y10), the test color coordinates of the second primary color light are (x20, y20), the target color coordinates of the second primary color light are (x21, y21), the target white balance color temperatures are (xw1, yw1), and the calibrated color coordinates of the second primary color light are calculated as (x2t, y2t) according to the following formula:

$$(x2t-x10)/(x20-x10)=(y2t-y10)/(y20-y10)$$

$$(x2t-xw1)/(x21-xw1)=(y2t-yw1)/(y21-yw1);$$

eye tristimulus values corresponding to the test color coordinates of the first primary color light are (X10, Y10, Z10), eye tristimulus values corresponding to the test color coordinates of the second primary color light are (X20, Y20, Z20), eye tristimulus values corresponding to the test color coordinates of the third primary color light are (X30, Y30, Z30), and the calibrated color coordinates of the second primary color light are (X2t, Y2t, Z2t), and adjustment coefficients (S21, S22, S23) of three primary colors corresponding to the second primary color light are calculated according to the following formula:

$$x2t=(S21*X10+S22*X20+S23*X30)/S;$$

$$y2t=(S21*Y10+S22*Y20+S23*Y30)/S;$$

$$z2t=(S21*Z10+S22*Z20+S23*Z30)/S;$$

wherein S is a constant.

5. The color coordinate calibration method according to claim 1, wherein the test color coordinates of the first primary color light are (x10, y10), the test color coordinates of the third primary color light are (x30, y30), the target color coordinates of the third primary color light are (x31, y31), the target white balance color temperatures are (xw1, yw1), and the calibrated color coordinates of the third primary color light are calculated as (x3t, y3t) according to the following formula:

$$(x3t-x10)/(x30-x10)=(y3t-y10)/(y30-y10)$$

$$(x3t-x31)/(xw1-x31)=(y3t-y31)/(yw1-y31);$$

eye tristimulus values corresponding to the test color coordinates of the first primary color light are (X10, Y10, Z10), eye tristimulus values corresponding to the test color coordinates of the second primary color light are (X20, Y20, Z20), eye tristimulus values corresponding to the test color coordinates of the third primary color light are (X30, Y30, Z30), the calibrated color coordinates of the third primary color light are (x3t, y3t, z3t), and adjustment coefficients (S31, S32, S33) of three primary colors corresponding to the third primary color light are calculated according to the following formula:

$$x3t=(S31*X10+S32*X20+S33*X30)/S;$$

$$y3t=(S31*Y10+S32*Y20+S33*Y30)/S;$$

$$z3t=(S31*Z10+S32*Z20+S33*Z30)/S;$$

wherein S is a constant.

6. The color coordinate calibration method according to claim 1, wherein the method further comprises beforehand:

adjusting a brightness of the display screen to a first brightness which is 50 to 100 nit higher than a preset target brightness.

7. A processing device, comprising: a processor and a memory storing a computer program that is runnable on the processor, wherein the processor is configured to execute the computer program, to enable the color coordinate calibration method according to claim 1 to be implemented.

8. A color coordinate calibration system, comprising: a display module, an optical test device, and the processing device according to claim 7, wherein:

the display module comprises a display panel and a light source module, the light source module emits a plurality of primary color lights; and the optical test device is configured to measure a chromaticity of the display panel.

9. The color coordinate calibration system according to claim 8, wherein the display panel is a liquid crystal display panel or a light emitting diode display panel.

10. A non-transitory computer readable storage medium, storing computer executable instructions, wherein the computer executable instructions are used for performing the color coordinate calibration method according to claim 1.

* * * * *